3,457,105
RUGS HAVING BACKINGS OF NITRILE LATICES
David J. Eisenberg, Oak Park, Mich., assignor, by mesne assignments, to Cadillac Overall Supply Company, Detroit, Mich.
No Drawing. Filed Nov. 10, 1966, Ser. No. 593,302
Int. Cl. C09d *3/48;* B44d *1/12*
U.S. Cl. 117—161      8 Claims

ABSTRACT OF THE DISCLOSURE

This application disclosed the concept of treating with an azo die a nitrile latex backing for a rug to prevent photodegradation and loss of skid resistance of such backing.

---

This invention relates to rugs or mats having nitrile latex backings treated to maintain their original skid resistance.

BACKGROUND OF THE INVENTION

Field of the invention

Rugs or mats are conventionally produced by coating the rear of a facing material such as cotton shag or the like with a backing layer formed of a nitrile latex, that is, a copolymer or butadiene and acrylonitrile. The specific composition of such latices, frequently referred to as acrylonitrile rubbers, may vary, with the acrylonitrile percentage generally ranging from approximately 20–65 weight depending upon the specific characteristics desired. The backing serves a number of functions, one of the most important of which is to provide the rug or mat with resistance to skidding in use, that is, sufficient frictional properties to preclude slipping of the rug or mat on the floor.

Nitrile latices are used extensively in rug backings since, in general, they have commercially desirable characteristics. However, they suffer from one serious disadvantage: they have a tendency to degrade in the presence of light. Specifically, photodegradation caused by natural sunlight and even indoor lighting deteriorates the latex coating, whether the light be received directly from its source or even passed through a glass window or the like. The effect of the photodegradation is evidenced in several ways. For example, the material has a tendency to discolor on "aging." Further, a degeneration of the physical properties of the material occurs when the same has been in use for some time. The effect of photodegradation on rug backings is particularly noticeable in a loss of the skid resistance provided by the backing. Since small rugs or mats are frequently utilized on relatively smooth surfaces such as wooden floors or the like, this inability to resist slipping presents a serious and dangerous problem.

The prior art

Many attempts have been made heretofore to improve the skid resistance of rubber backings by the incorporation of significant quantities of powdered additives such as portland cement or plaster of Paris to provide frictional properties to the backing. However, such techniques have obvious disadvantages in that the added materials are abrasive whereby they have a tendency to mar the floor on which the rug is utilized while simultaneously causing increased wear on the rug facing. Further, their very presence as an extraneous material impairs the ordinary functional properties of the latex backing.

The prior art has also approached the problem by attempting to develop techniques for inhibiting the photodegradation rather than merely incorporating friction-producing additives. While this approach is certainly preferable, the suggestions made heretofore have suffered from serious disadvantages which have made them undesirable from a commercial standpoint. For example, such prior art techniques have generally necessitated complex chemical reactions causing significant increases in the manufacturing costs. The improved functional properties realized with such prior art procedures have not been sufficiently significant to warrant the additional expenditures.

Another important limitation on the prior art techniques is their inability to affect the properties of previously manufactured articles which include a nitrile latex subject to photodegradation. The various procedures suggested heretofore have required manipulation of the original formulation either by the mere physical incorporation of a friction-producing additive or by the chemical modification of the constituent materials, but in any event, prior to formation of the article embodying the same. Thus, completed products such as rugs or mats having a nitrile latex backing could not be treated to improve the resistance of the backing to photodegradation.

SUMMARY OF THE INVENTION

A basic object of the instant invention is the provision of a rug whose nitrile latex backing is treated for inhibiting photodegration in a manner which is free from the foregoing and other such disadvantages. Further, this invention contemplates the provision of rugs which include a nitrile latex backing with improved resistance to deterioration from light sources, and more particularly, rugs or mats having a nitrile latex backing, the skid resistance and other characteristics of which will not degrade with time.

Other and further objects reside in the improved characteristics of the rugs. Still other objects will in part be obvious and in part be pointed out as the description of the instant invention proceeds.

THE PREFERRED PROCESS

It has now been found that photodegradation of nitrile latices backings of rugs may be inhibited in a simple and efficient manner by treating the latex, either prior to its use in the manufacture of a finished rug or subsequent to the preparation of a rug incorporating the same, with an organic dye containing the —N=N— chromophore group in its molecular structure, these materials conventionally being known as organic azo dyes. Numerous dyes of this type are known and all such materials provide some retarding affect on the tendency of nitrile latices to degrade or "age" in the presence of light. However, certain azo dyes provide particularly improved results, specifically monoazo, disazo and trisazo dyes and metal complexes of the same wherein the dyes are of the following general formulae

wherein $R^1$ is a radical selected from the group consisting of phenyl and naphthyl radicals and substituted phenyl and naphthyl radicals. $R^2$ is a radical selected from the group consisting of phenyl, naphthyl, pyrazolyl, quinolyl and acetoacetanilino radicals and $R^3$ is a radical selected from the group consisting of phenyl, triphenyl methane and naphthyl radicals and substituted phenyl, triphenyl methane and naphthyl radicals. Numerous examples of such materials can be set forth, the following list merely being illustrative:

$R^1$, $R^2$ and/or $R^3$ is phenyl or substituted phenyl

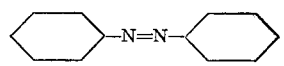

Azobenzene

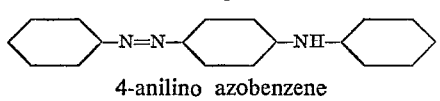

4-anilino azobenzene

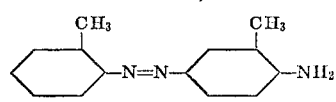

C.I. Solvent Yellow 1; C.I. No. 11000

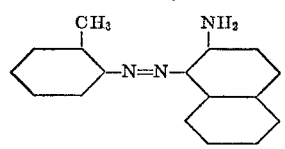

C.I. Solvent Yellow 3; C.I. No. 11160

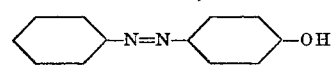

C.I. Solvent Yellow 6; C.I. No. 11390

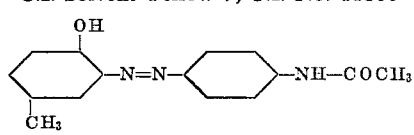

C.I. Solvent Yellow 7; C.I. No. 11800

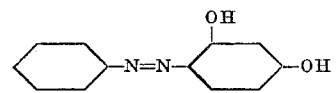

C.I. Disperse Yellow 3; C.I. No. 11855

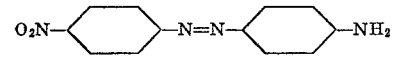

C.I. Solvent Orange 1; C.I. No. 11920

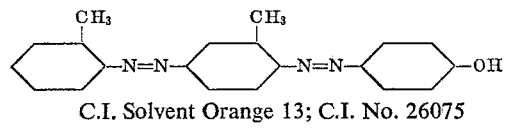

C.I. Solvent Orange 9; C.I. No. 11005

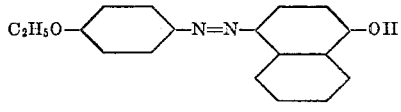

C.I. Solvent Orange 13; C.I. No. 26075

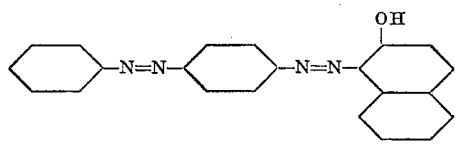

C.I. Solvent Red 3; C.I. No. 12010

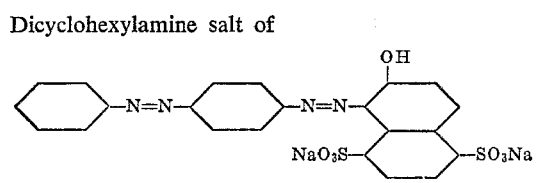

C.I. Solvent Red 23; C.I. No. 26100

Dicyclohexylamine salt of

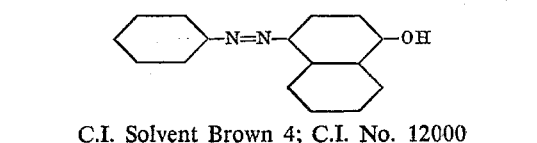

C.I. Solvent Red 30; C.I. No. 27921

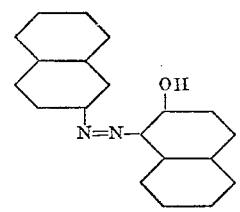

C.I. Solvent Brown 4; C.I. No. 12000

$R^1$, $R^2$ and/or $R^3$ is naphthyl or substituted naphthyl

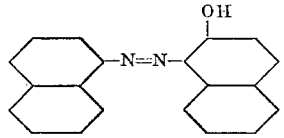

C.I. Solvent Orange 8; C.I. No. 12175

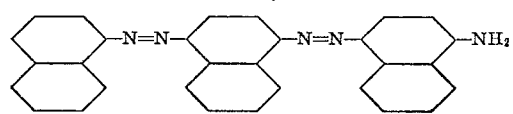

C.I. Solvent Red 4; C.I. No. 12170

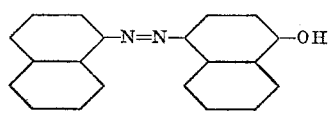

C.I. Solvent Red 29; C.I. No. 26030

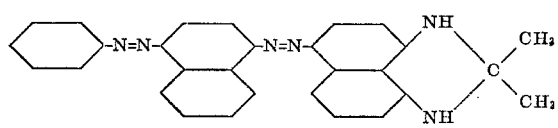

C.I. Solvent Brown 5; C.I. No. 12020

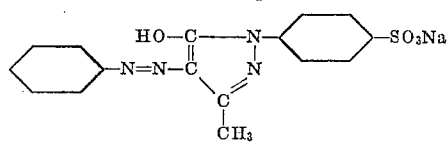

C.I. Solvent Black 3; C.I. No. 26150

$R^2$ is pyrazolyl or substituted pyrazolyl

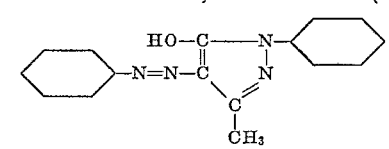

C.I. Solvent Yellow 15; C.I. No. 18820 (salt)

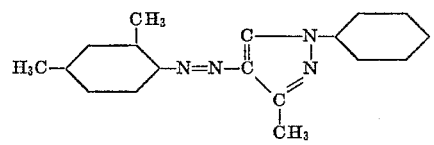

C.I. Solvent Yellow 16; C.I. No. 12700

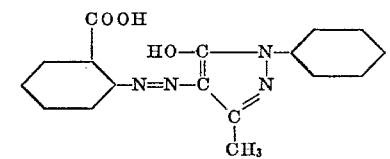

C.I. Solvent Yellow 18; C.I. No. 12740

C.I. Solvent Yellow 21; C.I. No. 18690

Cr complex of

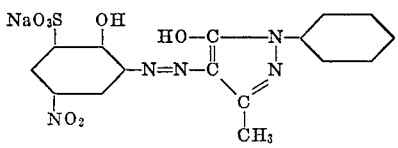

C.I. Solvent Orange 5; C.I. No. 18745A

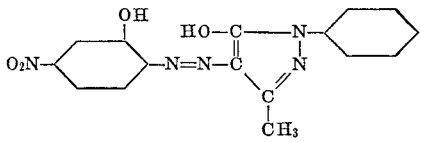

C.I. Solvent Red 8; C.I. No. 12715

$R^2$ is quinolyl or substituted quinolyl

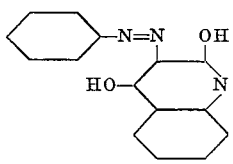

C.I. Solvent Yellow 17; C.I. No. 12770

$R^2$ is acetoacetanilino

Cr complex containing 1 atom Cr to 1 mol monoazo dye derived from

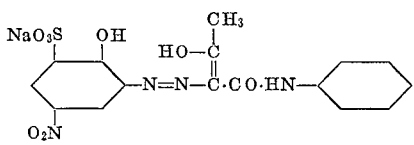

C.I. Solvent Yellow 19; C.I. No. 13900A $R^3$ is triphenyl methane or substituted triphenyl methane

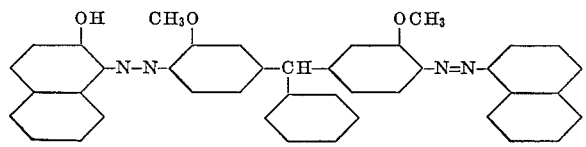

C.I. Solvent Red 18; C.I. No. 21260

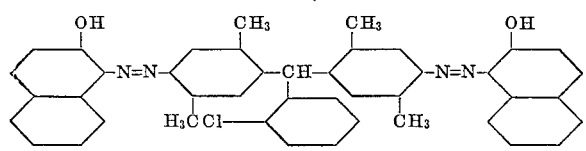

C.I. Solvent Red 22; C.I. No. 21250

"C.I." above refers to the Colour Index, The American Association of Textile Chemists and Colourists, 2nd edition, 1956. The preferred dyes are those in which at least one of the $R^1$, $R^2$ and $R^3$ is a substituted radical containing at least one chalcogenic constituent, that is, one having a constituent including N, O or S.

Most satisfactory results have been obtained with dyes identified in the Colour Index as Solvent Black Nos. 1, 2, 6 and 15 (monoazo), Solvent Black Nos. 3 and 4 (disazo), Solvent Yellow Nos. 1–25 (monoazo), Solvent Red Nos. 1–5, 7–17 and 40 (monoazo), Solvent Red Nos. 18–33 (disazo), Solvent Orange Nos. 1–12 (monoazo), Solvent Orange Nos. 13 and 14 (disazo), Solvent Violet Nos. 1 and 4–6 (monoazo), Solvent Blue No. 1 (monoazo), Solvent Brown Nos. 1–5 and 7–11 (monoazo), Solvent Brown Nos. 12 and 13 (disazo), Solvent Brown No. 14 (trisazo), Disperse Yellow No. 3 (monoazo). Additionally, azobenzene by itself is found to be particularly adapted for use with the instant invention as well as 4-anilino azobenzene and Irgacet Black RL, a product of Geigy Industrial Chemicals which is a mixed chromium complex of a mixed coupling of 4-nitro-2-aminophenyl, 5-nitro-2-aminophenyl and 6-nitro-4-tertiary amyl-2-aminophenyl on β-naphthol. In general, the Colour Index Solvent dyes are especially useful. It will be seen from the above list of preferred materials that not only are monoazo, disazo and trisazo materials useful, but further, the compounds may be the simple azo derivatives or they may be metaillic complexes such as chromium and cobalt complexes of the azo compounds.

As mentioned hereinabove, the azo dye may be incorporated directly into the nitrile latex as a dispersion or, alternatively, a solution of the dye may be utilized to coat a layer of a previously formed nitrile latex. The most economical technique is to disperse the dye in the latex before a layer of the latex is applied in the manufacture of the rug. This may be done by dissolving the dye in a small amount of solvent and using an emulsifier to put the solution into the latex formulation, or, in the alternative, the dye may be dispersed directly into the latex. However, in the event that the latex has already been incorporated as a backing on a rug or mat, the dye may be dissolved to form a solution which is then coated over the latex layer. Regardless of the technique, the photodegradation of the latex is inhibited by the presence of the azo dye.

The quantity of dye utilized can vary somewhat, as little as about 0.15 percent of the dye based on the dry weight of the latex providing significant reduction in photodegradation. Improved results were effected at 0.5 percent and optimum properties were realized at about 1 percent of the azo dye. Although slightly further improvement can be realized with 2–4 percent of the azo dye, the cost factor is such that the improvement, for most applications, is not sufficient to outweight the increased expenditures. Quantities of dye beyond about 4 percent, in addition to being costly and providing little advantageous properties, have a tendency to affect the characteristics of the latex itself and for this reason, in most instances, such quantities would be avoided.

The method of dispersing the dye in the original liquid latex or applying a solution of the dye over a preformed latex layer is not significant and many techniques would be obvious to those skilled in this art for accomplishing either operation. Further, the specific dispersing agents or solvents are well known and need not be discussed in great detail herein. Of course, these materials may vary for particular azo dyes, but those skilled in the art are sufficiently familiar with the properties of the various materials involved to select the proper ingredients.

Similarly, the specific latex formulation is not critical to the instant invention and many such materials are well known. For example, nitrile latices are available from Firestone under the trademark "Butaprene," from Goodyear under the trademark "Chemigum," from Goodrich under the trademark "Hycar," from Naugatuck under the trademark "Nitrex," and from International Rubber under the trademark "Tylak." In addition to the latex, which is the major component of a rug backing, other ingredients may be added for specific purposes. These ingredients vary greatly, but generally fall into the following classifications:

(1) Sulfur is ordinarily included as a vulcanizing agent;

(2) Dispersing agents are frequently utilized for insoluble materials, e.g., Atlas Powder Company's "Darvan No. 7";

(3) Emulsifying agents are generally included to facilitate dispersion of one immiscible liquid in another, either anionic, nonionic or cationic depending upon the specific formulation;

(4) Stabilizers are included to prevent premature coagulation, these materials generally being pH modifiers such as ammonia, caustic soda and caustic potash or protective colloids such as caseins, starches, alginates, gelatin or glue;

(5) Thickeners are utilized to increase viscosity, natural thickeners being alginates, gums, and starches and synthetic thickeners being carboxymethyl cellulose or sodium polyacrylate;

(6) Wetting agents may be included to facilitate impregnation on fibers and to increase wetability and decrease surface tension, common wetting agents being the alkyl aryl sulfonates, soaps and sodium alkyl sulfonates;

(7) Zinc oxide is generally utilized as a cure activator;

(8) Organic accelerators are included to control the rate of vulcanization;

(9) Anti-oxidants are included to impart age resisting properties; and

(10) Other optional ingredients include loading materials and softeners to modify physical properties and costs as well as pigments and perfumes to impart desired colors or odors.

Reference may be made to Introduction to Rubber Technology, Maurice Morton, Reinhold Publishing Company, 1959, pp. 451-454 for further details of such materials, but it is believed that these formulations are so well known as to not require further amplification.

Although it is believed that the instant inventive concept can be readily understood from the previous description, the following examples, wherein parts are by weight unless otherwise indicated, are set forth as illustrative:

EXAMPLE 1

Three portions of a latex formulation are prepared as follows:

| Ingredient | Dry weight | Wet weight |
|---|---|---|
| Water | | 70.0 |
| Sodium hexametaphosphate | 0.3 | 0.3 |
| Ammonia | | 0.4 |
| Titanium oxide | 10.0 | 10.0 |
| Whiting | 150.0 | 150.0 |
| Butadiene-acrylonitrile copolymer latex (50% acrylonitrile) | 100.0 | 185.0 |

In one portion of the above formulation, 1.0 percent by weight of the dry latex of Irgacet Black RL (identified above) is dispersed. The three portions are then coated on the rear of cotton shag rug facings in a conventional manner and in a layer of a thickness of ordinary dimensions. A supercoating of the same dye in an organic solvent is applied over one of the two backings not having the dye dispersed therein, the supercoating containing an equivalent amount of the dye to the dispersed formulation.

The two rugs treated with the dye show no loss in skid resistance with normal use. Further, these backing layers do not discolor on aging. In contrast, the untreated backing shows evidence of photodegradation when used in the same manner, the major effect being seen in a significant decrease in the skid resisting properties of the same with time.

Repeat of the same process using only 0.15 percent of the dye shows similar results although slightly less effect is noted.

Substitution of each of the other organic azo dyes listed above also results in significant reduction in photodegradation. Certain dyes are more effective than others, but all such materials provide a significant improvement.

It will now be seen that there is herein provided an improved process of inhibiting photodegradation in nitrile latices and improved articles produced thereby which satisfy all of the objectives of this invention, and others, including many advantages of great commercial importance.

Since many embodiments may be made of the instant inventive concepts and since many modifications may be made of embodiments herein described, it is to be understood that all matter herein is to be interpreted merely as illustrative and not in a limiting sense.

Accordingly, what is claimed is:

1. A rug comprising a rug facing and a nonskid underlay of a dried residue of a nitrile copolymer latex on the rear of said rug facing:
said latex underlay having dispersed therein an organic azo dye in an amount sufficient to inhibit loss of the already present non-skid properties of said underlay caused by photodegradation.

2. A rug according to claim 1 wherein the dye is in an amount of at least about 0.15 percent based on the dry weight of said underlay.

3. A rug according to claim 2 wherein the dye is in an amount of between about 0.15 percent and 4.0 percent based on the dry weight of said underlay.

4. A rug according to claim 1 wherein the dye is in an amount of between about 0.15 percent and 1.0 percent based on the dry weight of said underlay.

5. A rug according to claim 1 wherein the underlay is the dried residue of a latex of a copolymer of butadiene and acrylonitrile.

6. A rug according to claim 1 wherein the underlay is the dried residue of a latex of a copolymer of butadiene and acrylonitrile and wherein the dye is in an amount of at least about 0.15 percent based on the dry weight of said underlay.

7. A rug according to claim 1 wherein the underlay is the dried residue of a latex of a copolymer of butadiene and acrylonitrile and wherein the dye is in an amount of between about 0.15 percent and 4.0 percent based on the dry weight of said underlay.

8. A rug according to claim 1 wherein the underlay is the dried residue of a latex of a copolymer of butadiene and acrylonitrile and wherein the dye is in an amount of between about 0.15 percent and 1.0 percent based on the dry weight of said underlay.

References Cited
UNITED STATES PATENTS

| | | |
|---|---|---|
| 2,431,001 | 11/1947 | Sullivan. |
| 2,769,722 | 11/1956 | Converse. |
| 2,927,737 | 3/1960 | Tischbein. |
| 3,031,325 | 4/1962 | Roberts. |
| 3,227,574 | 1/1966 | Mohr _____ 161—66 X |
| 3,257,379 | 6/1966 | May et al. _____ 260—45.9 X |
| 3,304,285 | 2/1967 | Cox _____ 260—45.9 |
| 3,330,689 | 7/1967 | Ells et al. |

WILLIAM D. MARTIN, Primary Examiner

R. HUSACK, Assistant Examiner

U.S. Cl. X.R.

117—62, 76, 143; 161—251; 260—41.5, 45.9